Nov. 5, 1968  R. J. LEE  3,408,988
FEED RECEPTACLE
Filed Oct. 31, 1966
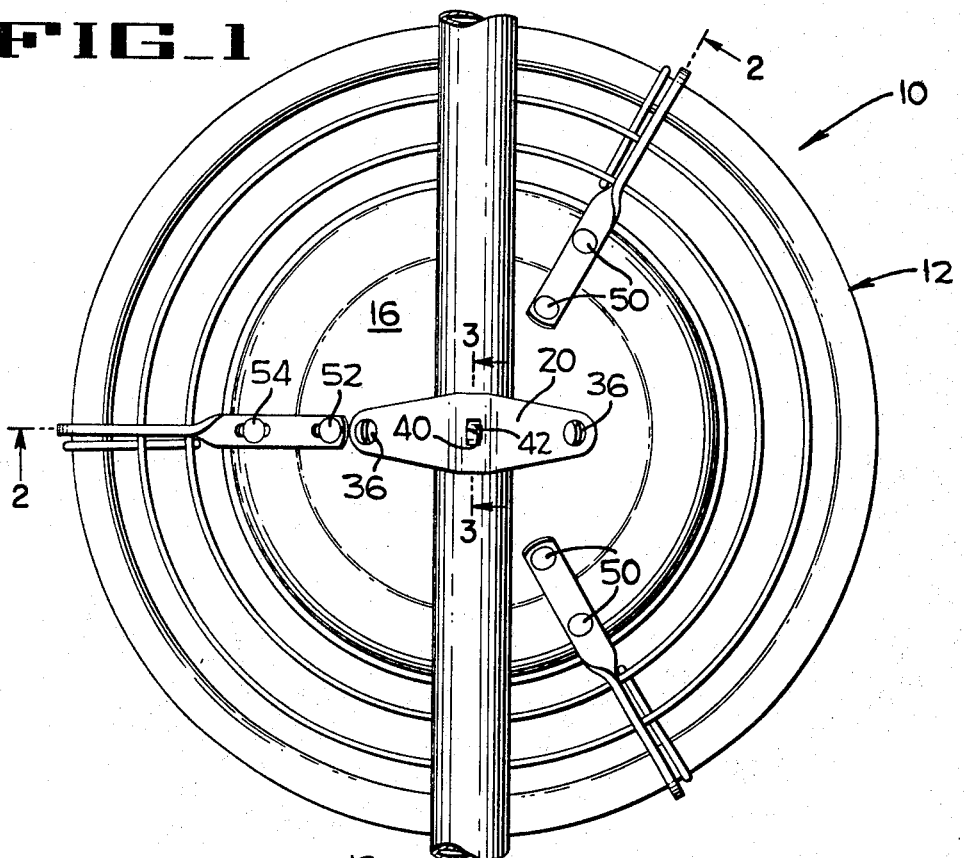
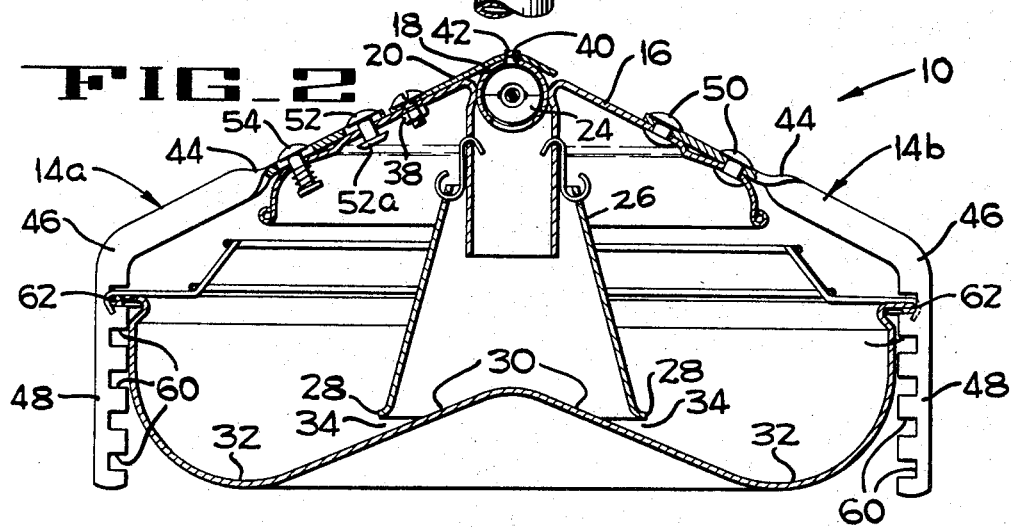
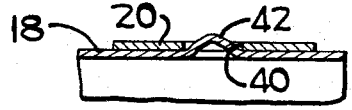
INVENTOR
ROBERT J. LEE
BY *Newton, Hopkins,
Jones & Ormsby*
ATTORNEYS

United States Patent Office 3,408,988
Patented Nov. 5, 1968

3,408,988
FEED RECEPTACLE
Robert J. Lee, Tipton, Ind., assignor to Bramco Inc.,
Canton, Ga., a corporation of Georgia
Filed Oct. 31, 1966, Ser. No. 590,947
5 Claims. (Cl. 119—53)

ABSTRACT OF THE DISCLOSURE

A feed receptacle having a pan which is adjustable vertically, the pan being supported by a plurality of spaced arms, the arms having notches which receive the pan at various levels.

---

This invention relates to a feed receptacle and more particularly to a receptacle which can be adjusted to control the rate at which feed is made available for consumption by domestic animals such as poultry.

In achieving a design which is durable and yet provides a relationship of structure for controlling the rate at which the feed is distributed through the novel receptacle, this invention employs a feed receiving pan located with respect to a feed conveying member in such a manner that the rate at which feed is distributed to the pan is regulated.

Novel pan supporting members are provided and are arranged to permit adjustment of the spacial relationship between the pan and the conveying member to control the flow rate of the feed. More particularly, the pan to formed with a central upwardly projecting conical portion serving as a spillway, allowing the feed to migrate toward the sidewalls of the pan where it is easily accessible to the animal being fed. Extending upwardly and in spaced relationship with the conical portion, a sleeve is provided for directing the feed, derived from a suitable supply system, to the conical portion of the pan. The lower end of the sleeve and the conical portion of the pan define an annular discharge passageway through which the feed passes as it cascades down the inclined walls of the conical portion. The pan is supported by a plurality of arms designed to permit variation in the distance between the conical portion and the lower end of the sleeve and in this way regulate the rate at which feed is made available in the pan since the annular discharge passageway can be accordingly increased or decreased as desired.

Accordingly, it is an object of this invention to provide a new and improved feed receptacle.

Another object of this invention is to regulate, in a novel manner, the rate at which feed is supplied to the receptacle.

Another object of this invention is to facilitate removal of the pan from its supporting structure.

Another object is to provide an improved selectively adjustable mechanism for controlling the rate at which feed is delivered to an animal fed receptacle.

Another object is to provide an improved, quick disconnector support mechanism for an animal feed receptacle.

These and other objects of the invention will become apparent during the course of the following description.

In the drawings:

FIGURE 1 is a plan view of the feed receptacle constructed according to the invention, the receptacle being illustrated as mounted on a feed supply conveyor tube.

FIGURE 2 is a transverse section taken substantially along the lines of 2-2 of FIGURE 1.

FIGURE 3 is an enlarged fragmentary section taken substantially along the lines 3-3 of FIGURE 1.

The feed receptacle constructed according to this invention is generally indicated by numeral 10 and includes a pan 12, preferably circular in shape, supported by a plurality of regularly spaced suspension arms 14a, 14b and 14c, each of which is attached to a dome-shaped feeder top 16 which is releasably attached to a conveyor tube 18 by a retaining clamp 20. Feed from any suitable source is fed to the tube 18 and carried therethrough. At those locations where it is desired to locate the feed receptacle along the tube 18, an opening 22 is provided to allow the feed moved by a conveyor 24 to be gravitationally discharged into the pan 12.

Attached to the undersurface of the feeder top 16 and surrounding the opening 22 there is a downwardly extending outwardly tapering tubular sleeve 26 having its lower end formed with an outwardly flared lip 28. Feed flowing downwardly in the sleeve 26 encounters a conical distributing wall 30 formed centrally of the pan 12 which causes the feed to migrate radially outwardly to the trough portion 32 of the pan. The conical surface 30 and the flared lip 28 of the tubular sleeve define an annular passageway 34 operating to regulate the rate at which the feed is allowed to flow to the trough portion 32. Regulation of the rate of feed flow in this manner is also shown in the patent to Atcheson 3,102,511, issued September 3, 1963, and assigned to the assignee of the present invention.

In accordance with one feature of this invention there is provided a very simple and effective means for locating the receptacle 10 at selected points along the conveyor tube 18. As shown in FIGURE 2, the retaining clamp 20 is formed to overlie the upper surface of the feeder top 16 and is attached thereto by means of screws 36 threadedly engaged by nuts 38 suitably secured, preferably by welding, to the undersurface of the feeder top. The apex of the retaining clamp 30 is formed with a generally rectangular slot 40 within which is received an upwardly extending offset boss 42. If desired, rather than forming the boss 42 by displacing a portion of the tube radially outwardly, small blocks may be suitably secured on the outer surface of the tube so that they may be received in the rectangular slot 40 of the retaining clamp 20. Thus, it is apparent that if the necessity of removing the pan 10 from the tube arises, all that is necessary is to remove the screws 36 allowing the receptacle to be removed in its assembled relation.

Although it is known to provide an annular passageway of variable size in order to increase or decrease the rate at which feed is supplied, this invention provides a relationship structure of more simple and trouble free design to accomplish this result. Each of the arms 14a, 14b and 14c are made of a rectangular stock and are formed with a 90 degree twist, indicated by the numeral 44, and are bent inwardly at 46 defining respective downwardly extending lower portions 48. The arms 14b and 14c are rigidly connected to the feeder top 16 by means of rivets 50 whereas the supporting arm 14a is captively, loosely mounted on the feeder top 16 to permit a desired amount of pivotal movement. As shown in FIGURE 2, the arm 14a is connected to the feeded top 16 by a rivet 52 which is of sufficient length so that, when it is upset at 52a, the length of a shank is substantially greater than the combined thickness of the arm 14a and the top 16. The remaining rivet 54 also has an elongated shank but it is surrounded by a helical compression spring 56, one end of which bears against the inner surface of the top 16 and the remaining end is seated against a small washer 58 secured to rivet 54. Spring 56 is of sufficient length to be subjected to compression when the arm is in the position shown in FIGURE 2. According to the above, it will be apparent that the arm 14a is readily pivotally movable against the bias of the compression spring 56 in a clockwise direction as viewed in FIGURE 2.

Downwardly extending portions 48 of each arm is provided with a series of spaced slots 60 for engaging a peripheral upwardly extending flange 62 of the pan 12. When the flange 62 is engaged with the uppermost slot, the area of the angular passageway 34 is at a minimum, accordingly the rate at which feed is distributed to the trough portion 32 is also at a minimum. Progressive increases in the flow rate are easily accomplished by engaging the flange 62 in respective slots 60 increasing the distance of the conical surface 30 from the flared lip 28 with the maximum rate of flow being provided when the flange 62 is in the lowermost slot of each arm. Changing the position of the pan 12 with respect to the tubular sleeve 26 is easily accomplished by merely pivoting the arm 14a in a clockwise direction with one hand while the other grasps the pan 12 and then inserting the flange 62 in the appropriate slot while the arm 14a is in its outwardly rotated position and then releasing the arm 14a allowing it to assume a supporting position as shown in FIGURE 2.

From the above description it is readily apparent that the feeding receptacle of this invention provides a very simple and effective means for locating the receptacle at any point along the feed supply system and provides a structure whereby variations in the feed rate can be accomplished without the necessity of complex mechanisms as have heretofore been proposed.

While one embodiment of the present invention has been shown and described it will be understood that various changes and modifications may be made therein without departing from the spirit of the invention or the scope of the appended claims.

What I claim is:

1. In a feed receptacle of the type including a feed containing a pan supported from a feed supply system, and a sleeve supported by said feed supply system centrally and above said pan to define an annular passageway for permitting feed to be deposited in such pan, the improvement for adjusting the size of said annular passageway comprising a plurality of circumferentially spaced, downwardly extending arms suspended from said feed supply system, means on said arms including a plurality of vertically spaced slots for releasably engaging an outward extending flange of the pan for varying the distance of said pan from said sleeve to thereby vary the size of said annular passageway, and means for allowing at least one of said arms to be disengaged from said pan to enable location of said pan at a desired distance from said sleeve.

2. The feed receptacle according to claim 1 wherein said improvement further comprises a clamp releasably attaching said pan to predetermined positions along the feed supply system, and wherein said means for disengaging said arm from said pan includes a spring-biased fastener which allows said arm to be displaced so that the pan may be adjusted relative to said sleeve.

3. A feed receptacle according to claim 1 wherein said pan has a floor with an upwardly projecting conical portion and wherein said sleeve is a downwardly opening generally frusto-conical member whose lower ends coact with the side surfaces of said upwardly projecting conical portion to define an annular inlet passage to said pan.

4. A feed receptacle according to claim 1 including a cover disposed in said spaced relative above said pan wherein said means for releasably engaging said pan comprising means mounting said arms in overlying relation to said cover and projecting downwardly and outwardly along said cover, one of said arms having spaced holes aligned respectively with radially spaced holes on said cover, rivets loosely disposed in the aligned holes, each rivet having an enlarged end overlying said one arm and underlying said cover, and a spring disposed between the underside of said cover and the adjacent enlarged end portion of the rivet in the lowermost of the aligned holes.

5. An animal feeding device comprising a generally horizontal tube type conveyor for supplying animal feed, said tube conveyor having longitudinally spaced openings therein for discharging feed therefrom, a feed containing receptacle including a generally conical dome member including an opening at its apex adapted to be aligned with the opening in said tube conveyor, an upwardly projecting boss on said tube conveyor, a strap member including an opening for receiving said boss and embracing a peripheral portion of said tube conveyor, means for attaching said strap member through said conical dome in order to rigidly connect the conical dome to the tube conveyor, a plurality of outwardly and downwardly extending support arms having respective portions thereof connected to said dome member, said arms including generally parallel downwardly extending portions on each of which are provided a plurality of spaced slots, a pan for accumulating feed so that it is readily accessible to the animals desired to be fed, said pan including an upwardly extending wall formed with an outwardly projecting flange adapted to be received by the slots in said arms, said pan further including a centrally upwardly projecting conical portion providing a surface along which feed is gravitationally fed to the trough portion of said pan, an elongate tubular tapered sleeve having its end of larger diameter located above and centrally of the conical portion of said pan and its end of a smaller diameter connected to the inner surface of the dome, the conical portion of said pan and the lower end of said sleeve defining an annular passageway through which the feed passes in order to be distributed through the trough portion of the pan, means mounting one of said arms to permit movement thereof in a direction disengaging its slots from the outwardly projecting flange for allowing the pan to be located in other of the slots of the respective arms.

References Cited

UNITED STATES PATENTS

| 1,879,264 | 9/1932 | Hughes et al. | 119—77 |
| 3,033,163 | 5/1962 | Hostetler et al. | 119—52 |
| 3,230,933 | 1/1966 | Myers et al. | 119—53 |

HUGH R. CHAMBLEE, Primary Examiner.